Fig.1.

June 27, 1933.  J. G. BRENNER ET AL  1,915,848
AUTOMATIC SELECTIVE SOUND REPRODUCING MACHINE
Filed Oct. 2, 1930  8 Sheets-Sheet 2

Fig.1.ª

Inventors:
John G. Brenner.
Bernard W. Brenner.
By their Attorney: Walter Gunn June 27, 1933.  J. G. BRENNER ET AL  1,915,848
AUTOMATIC SELECTIVE SOUND REPRODUCING MACHINE
Filed Oct. 2, 1930  8 Sheets-Sheet 8

Inventors
John G. Brenner.
Bernard W. Brenner.
By their Attorney: Walter Gunn

Patented June 27, 1933

1,915,848

UNITED STATES PATENT OFFICE

JOHN GEORGE BRENNER AND BERNARD WILLIAM BRENNER, OF COBHAM, ENGLAND

AUTOMATIC SELECTIVE SOUND REPRODUCING MACHINE

Application filed October 2, 1930, Serial No. 486,034, and in Great Britain October 2, 1929.

This invention refers to sound reproducing machines and in particular those known as multiple-record machines, i. e. machines provided with a number of sound reproducing records (discs), a sound box and needle, and adapted to allow of any one of the records being selected and played at will.

The object of the invention is to provide a new or improved construction of this type of machine.

According to the invention, the improved machine comprises a rotary multi-record holding magazine, a motor-driven playing table, record pick-up and carrier devices and guide track therefor, said pick-up and carrier devices being movable in a plane at right angles to the plane of rotation of the magazine, and being adapted to engage the selected record in the magazine and transfer it to the playing table, and after being played, return it to the magazine. The said record pick-up and carrier devices and the guide track may be adapted to reverse the record after removing it from the magazine and before placing it on the table, when the matter to be played is on the lower side of the record, the record being reversed back again as the pick-up and carrier devices replace it in the magazine. The machine also comprises an index dial and selector mechanism for controlling the rotations of the magazine, the magazine being rotated by the motor which drives the playing table, through the medium of a slipping clutch, and the selector mechanism serving to arrest the motion of the magazine when the selected record has reached a predetermined position. The magazine comprises a hub part, fixed flat spokes with their outer ends forked, further spokes flexibly connected to the fixed spokes and adapted to engage and hold a record between them, the flexible spokes each having a pointed peg or stud to enter the central hole in the record, and each being slightly longer than the fixed spokes. Other features of the machine consist of a tone arm and tone arm raising and lowering mechanism; "toggle" controlled braking mechanism for holding the playing table normally stationary and releasing the table just prior to a record having been placed thereon; winding gear for the motor (in the case of a spring motor) and means for preventing over-winding of the motor, and in the case of a coin-controlled machine means for holding the winding gear disconnected from the motor until after a coin has been inserted; means for giving the tone arm an upward and outward movement when raised and a downward and inward movement when lowered; means whereby the needle is made free of all vertical restraint when resting on the table; and means for timing the playing of a record and stopping the motor after the record has been played. Other features reside in constructional details hereinafter described. The machine may be other than coin-controlled, and an electric motor may be used in place of a spring motor. Further, an electric pick-up may be used, and the machine connected to a wireless receiver.

Upon the accompanying drawings:—

Before describing the machine in detail, it will be advantageous to indicate its main parts.

1 is the disc record-holding magazine, 2 the index dial and $2^a$ the selector disc by which the record to be played is first selected, 3 the motor for operating various parts of the machine, 4 the playing table upon which the selected record is placed after being removed from the magazine, and from which after being "played", it is removed and put back into the magazine whilst 5 is the pick-up and carrier mechanism for picking up the selected record in the magazine 1 and transferring it to the playing table 4, and returning it to the magazine after playing. 6 is the tone arm and 7 the sound box and needle for reproducing the matter engraved on the records.

Figure 1:
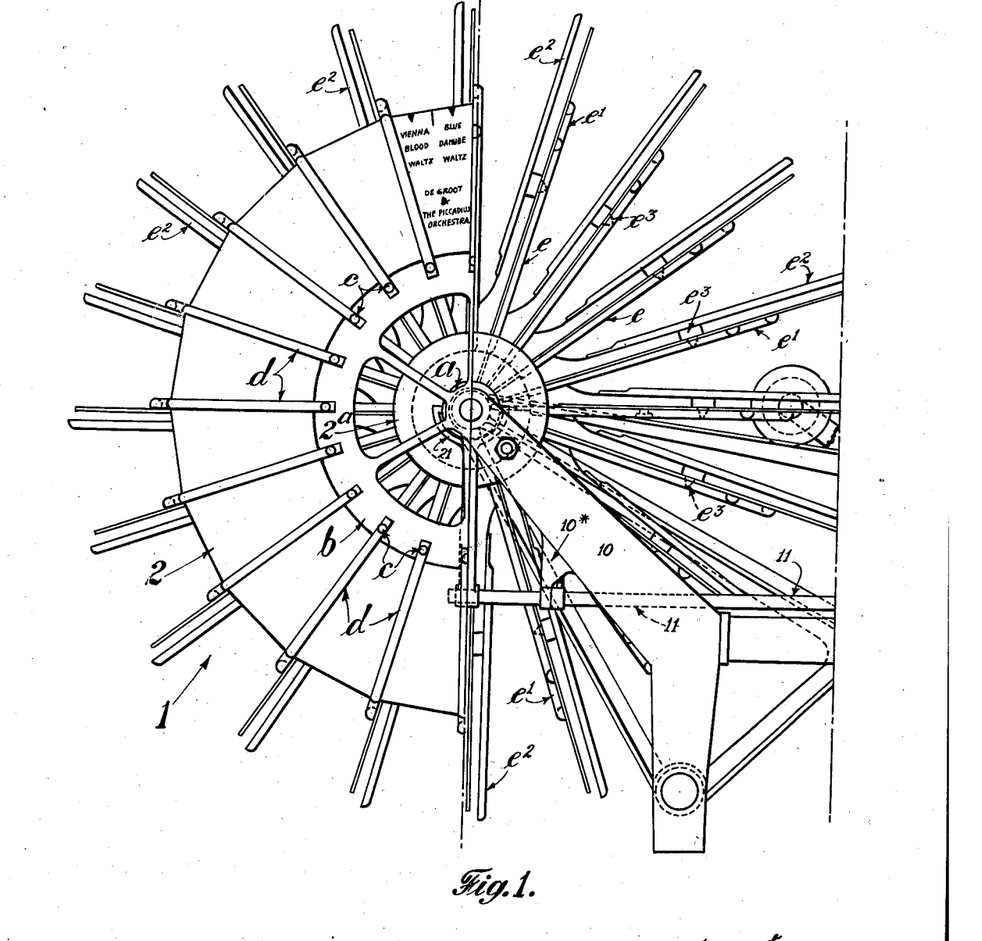
Figs. 1 and 1a are collectively a side elevation.

In the example of the machine shown, Figs. 1, $1a$, 2 and $2a$, the index dial 2 is keyed to a shaft 8 in line with a further shaft 9 to which the record-holding magazine 1 is keyed. The index dial 2 consists of a central hub part $a$ and a rim part $b$. Rivets or screws $c$ serve to fix pairs of division strips $d$ to the rim part. By means of such strips, small interchangeable white cardboard or paper slips bearing the titles of the records are fixed to the dial, the titles on the opposite sides of a record being on the same slip and to right and left respectively of a central dividing line, see Fig. 1.

The shaft 8 takes its bearing in parts 10.10 of the machine frame, and is held against endwise movement by the dial hub $a$ and by a collar $11^b$. The index dial 2 is fixed to the shaft 8 by pin $11^a$, the shaft at its front end being milled to allow of easy hand rotation. At its rear end the shaft 8 is provided with a spigot, taking into a recess in the shaft 9, the two shafts however, being otherwise independent of one another. The magazine 1 consists of a hub part with fixed flat metal spokes $e$, which at their free ends are formed with diverging extensions $e^1$. The magazine also consists of further flat metal spokes $e^2$, which are flexibly connected to the spokes $e$ and always tend to engage the next succeeding spoke $e$. Each spoke $e^2$ has a peg or stud $e^3$ with conical end.

The gramophone disc records lie one between each pair of rigid and flexible spokes, the peg or stud $e^3$ entering the usual central hole in the record, and thus positioning the record between the spokes. By employing the pegs or studs $e^3$ the magazine will hold records of varying diameters.

Upon the index dial shaft 8 is slidably keyed the selector disc $2^a$, see Figs. 2, 12, 13, 14 and 15. Such disc has an annular flange on its rear face and at its periphery and in such flange, teeth $2^b$ are formed, producing between them spaces of varying depth i. e., each alternate space being deeper than the intermediate space. Upon the rear face of the said disc is a pair of shoulders $2^c$, $2^d$, see Figs. 12 and 13.

Figure 2:
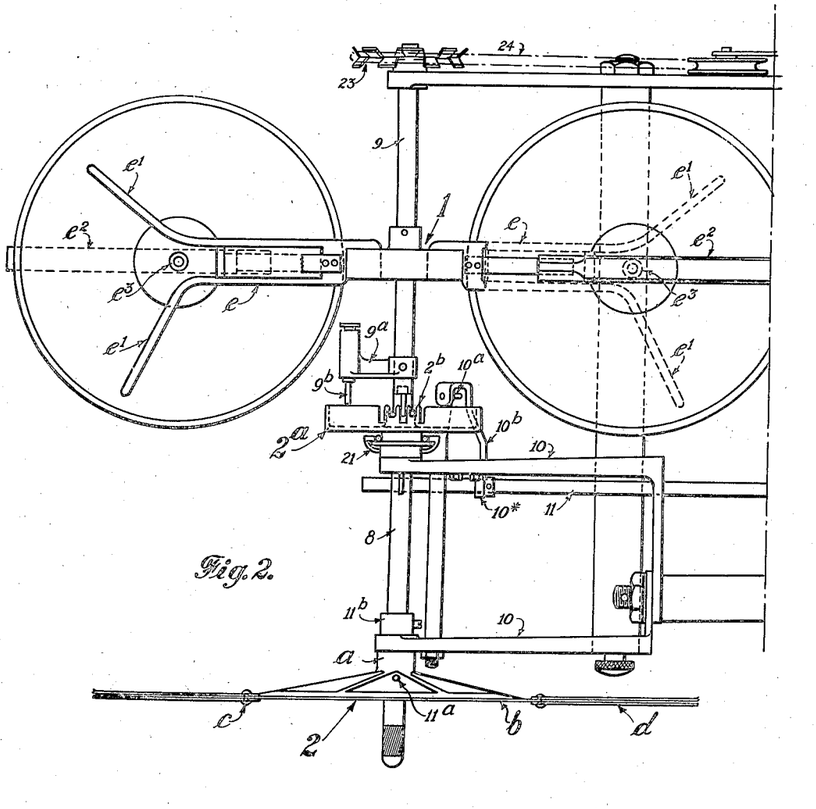
Figs. 2 and 2a are collectively a plan of the improved machine.
Figure 13:
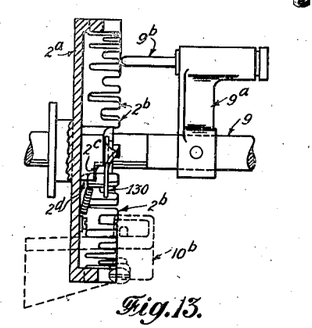
Fig. 13 a cross section of the selector disc, Fig. 13 also showing a side view of the magazine stop pin.
Figure 14:
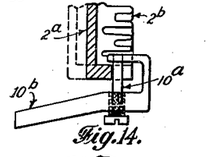
Figs. 14 and 15 are sectional views of parts of the selector disc and disc-locking devices.
Figure 15:
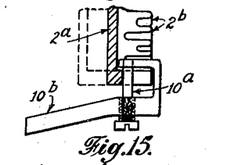

Secured to the magazine shaft 9 is a selector arm $9^a$ carrying a spring-held pin $9^b$, which faces the rear side of the selector disc $2^a$, see Figs. 2 and 13. The selector disc is movable towards and away from the selector-arm pin $9^b$.

On rotating the index dial 2, and with it the selector disc $2^a$, to bring the selected title or number of a record opposite an arrow point on a stationary plate (such as the glass front of an outer casing of the machine, not shown), one of the spaces between the teeth on the selector disc corresponding to the selected record (there being as many teeth spaces as names on the index dial) comes opposite a stud $10^a$, carried by a bracket $10^b$ fixed to part 10 of the machine frame, so that when the selector disc is moved endwise towards the magazine, a tooth space engages the stud $10^a$ and the selector disc is thus held against rotation. Further, in sliding the disc endwise towards the magazine, one of the shoulders $2^c$ or $2^d$ comes into the path of the selector-arm pin $9^b$, and forms a "stop" for the magazine after the latter has been rotated the desired extent to bring the selected record to the point where it may be removed from the magazine and transferred to the playing table.

The selector-arm pin $9^b$ engages the shoulder $2^c$ for one side of the record and the shoulder $2^d$ for the other side of the record, and such engagement is determined by the depth of the selector disc teeth spaces, the disc moving further when a deep space engages the fixed stud $10^a$ than when a shallow space engages the stud.

The endwise movements of the selector disc are effected and controlled automatically by a pair of control shafts 11, 12, arranged end to end, see Fig. 2, which take their bearings in parts 10°, 13, 14 and 15 of the machine frame, and in the hub of a wheel 16. Keyed to the adjacent ends of the control shafts is a pair of companion lever arms 17, 18, see Fig. 3, the two lever arms tending to approach each other and a fixed stop 19 under the pull of a spring 20 common to both. The control shaft 11 extends to a point below the selector disc shaft 8 and is there fitted with a lever arm 21 having a forked end, which, engages a groove in the boss of the selector disc, see Figs. 2 and 13, so that, when the control shaft is given a part rotation in one direction, the selector disc is moved along its shaft towards the magazine 1. As hereinafter explained, the control shafts are moved (rotated) in one direction by mechanism under the control of the motor-winding gear, and in the reverse direction by a spring 22.

Figures 19, 20:
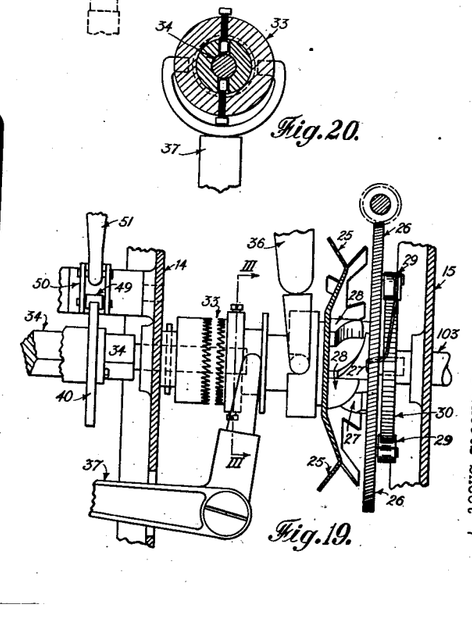
Fig. 19 is a longitudinal part sectional plan of the slipping clutch and cam clutch.
Fig. 20 is a cross section of Fig. 19 on line 111—111.

The magazine 1, is rotated by means of a pulley 23 on its shaft by an endless cord 24, and by a pulley 25, this latter engaging a motor-driven wheel 26, through the medium of a slipping clutch, see Fig. 19, composed of inclined teeth 27 on the wheel 26 and like teeth 28 on the wheel 25. The driving connection between the motor and the wheel 26 is effected by means of pawls 29 and ratchet teeth 30. The motor 3 is similar to that commonly used in an ordinary gramophone machine, the motor being wound up by hand as hereinafter explained.

Adjacent to the pulley 25 is a "dog" clutch 33 for clutching the motor 3 to a cam shaft 34, or declutching same, said "dog" clutch being hereinafter called the "cam" clutch. Upon the cam shaft 34 (which is of square section) is a series of cams for controlling the operation of various parts of the machine. The cams are of the disc type and operate by their edges upon the objects to be moved by them.

Figure 2A:
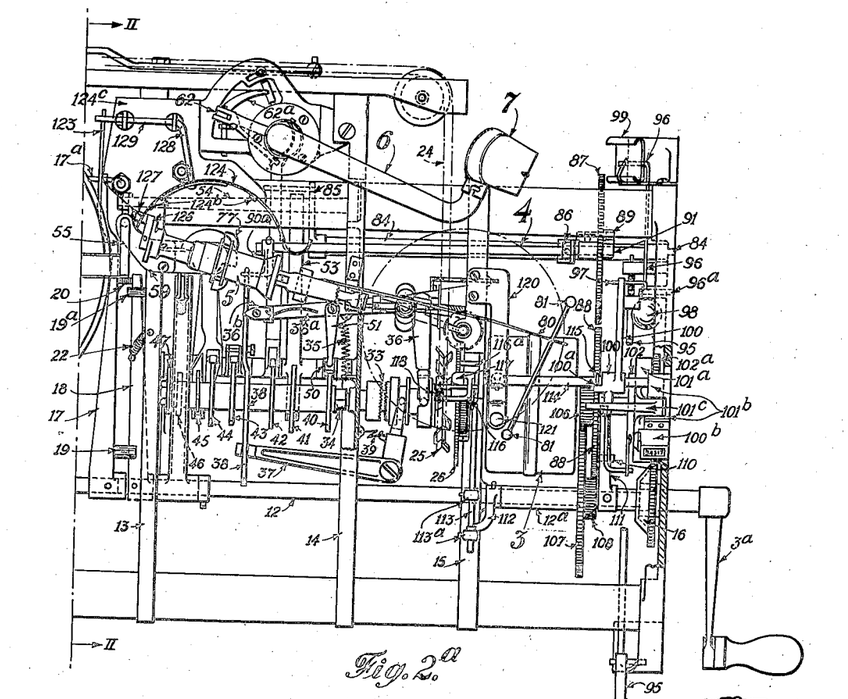
Figures 7, 8, 9:
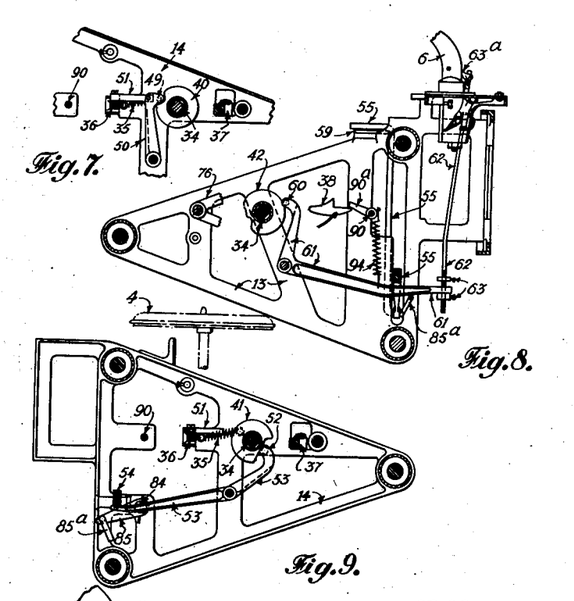

The slipping clutch is normally held in engagement with the motor wheel 26 by a spring 35 operating through a bell-crank lever 36, see Figs. 2a and 9, while such lever is controlled by one of the cams when requiring to hold the slipping-clutch positively out of action. The "cam" clutch 33 is held out of action by a further bell-crank lever 37, and a latching lever 38, and when released by the latching lever, its parts are moved into engagement by a spring 39. The movements of the slipping-clutch lever 36 control the movements of the "cam" clutch lever 37, this latter being released as the slipping-clutch lever 36 comes out of action.

There are eight cams on the cam shaft, 40 to 47. The cam 40 controls the slipping clutch (by letting in or holding out) through the medium of a roller 49 carried by lever arm 50, see Fig. 7, and connected to lever 36 by a link 51. The cam 41 controls the releasing of the selected record from the magazine, i. e., the separation of the spokes $e$, $e^2$, see Fig. 9, though the medium of a roller 52 and lever 53, the free end of which latter lies below a further lever 54, connected to the lower end of a rod 55, passing through a guide bracket 59, and at its upper end lying below the adjacent horizontal spoke $e^2$ of the magazine. Cam 42 controls the raising and lowering of the tone arm 6, see Fig. 8, and the bringing into operation of "timing" gear (hereinafter described and shown in Fig. 24) according to the set length of record to be reproduced. The cam 42 raises the tone arm through the medium of a roller 60, lever 61, rod 62, with collars 63, against the lower end of which lever 61 bears, the rod being connected at its top end, see Figs. 10 and 11, to a projection 63ª on the tone arm. Cam 43 controls the cam clutch 33 and the latching lever 38 through the medium of a roller 64, and a lever 65, see Fig. 6. Cams 44 and 45 control the opening and closing of the record pick-up or carrier-arm jaws as hereinafter described, see Fig. 5, and cams 46 and 47 control the swivelling movements of the carrier mechanism, see Fig. 4. Such carrier mechanism is supported at the top of a hollow vertical shaft 66, and comprises a horizontal boss or bearing member 67, and a short spindle 68 journaled in said member. To such spindle the carrier-arm jaws 69, 70 are hinged, see Figs. 1a and 16. Slidably mounted on a forked boss 70ª, forming part of said spindle 68 is a sleeve 71 with inner conical end face 70ᵇ, and by the end movement of such sleeve in one direction the carrier jaws 69, 70 are caused to move towards each other against the resistance of a spring 72, while with the reverse movement of the sleeve, the jaws separate under the action of the spring, small rollers 73 on the jaws acting against the conical face of the sleeve. The jaw 69 is longer than the jaw 70, and such longer jaw extends over the playing table 4 in one position of the carrier arm, and over the centre of a record in the magazine in another position of the carrier arm.

Figures 3, 4, 6, 6A:
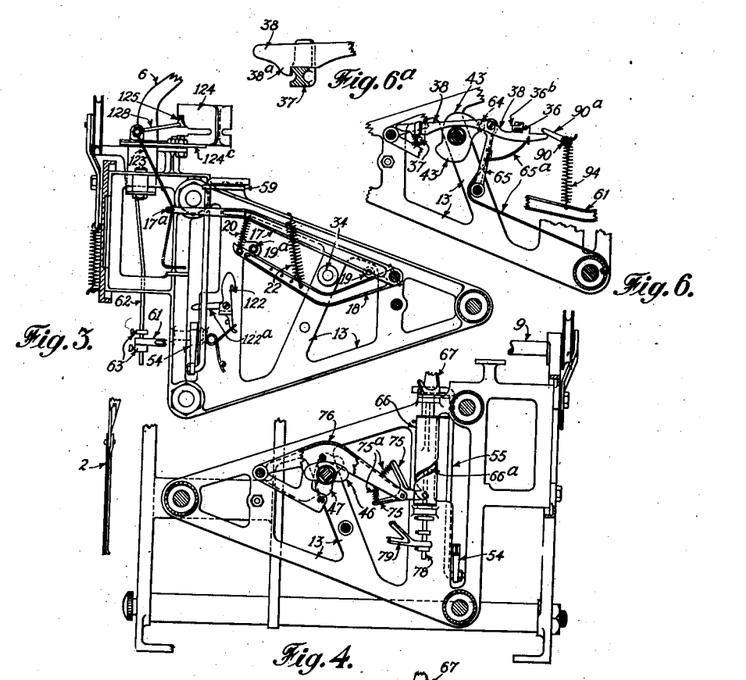
Fig. 3 is a cross section of the machine on line 11—11 looking towards the right hand end of the machine.
Figs. 4 to 9 are further cross sections respectively taken in the planes of the several controlling cams (40 to 47) hereinafter described looking towards the magazine end of the machine in the case of Figs. 4, 5, 6 and 8, and looking away from the magazine in the case of Figs. 7 and 9.
Figures 16, 17, 18:
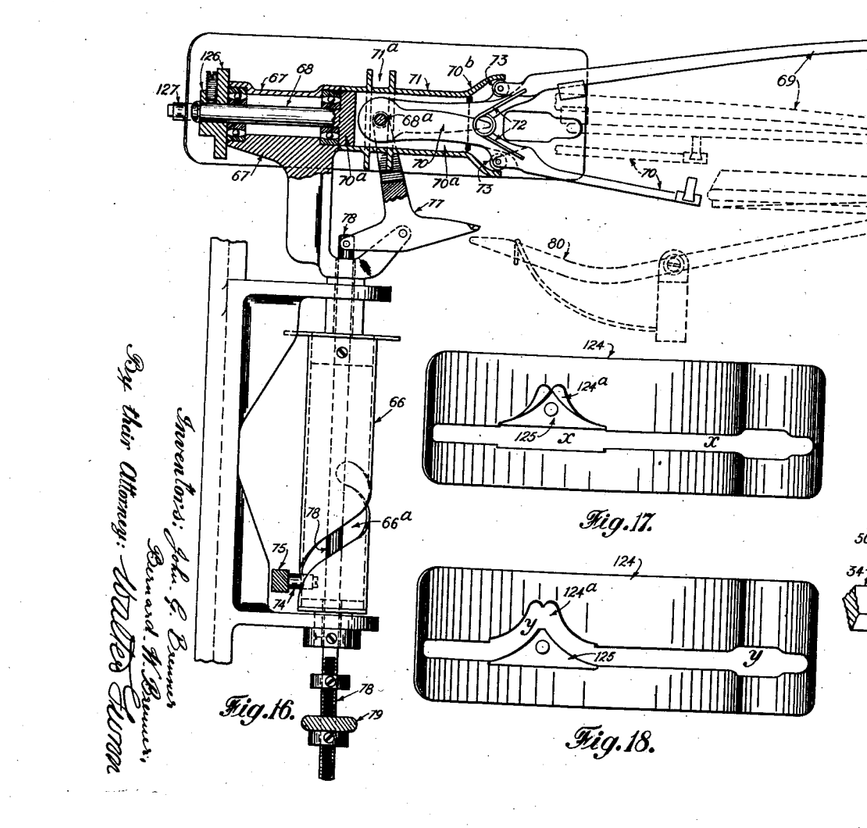
Fig. 16 is a part longitudinal sectional elevation of the record pick-up and carrier mechanism also drawn to an enlarged scale.
Figs. 17 and 18 are front elevations respectively of the double track plate for controlling the record-reversing action of the pick-up devices, Fig. 17 showing parts of the track in the position they occupy when the record does not require to be reversed, and Fig. 18 showing the parts and the position they occupy when the record requires to be reversed.

The swivelling movements of the record-carrier mechanism, see Figs. 4 and 16, are obtained by means of a spiral slot 66ª in the vertical carrier shaft 66, and a roller 74 on the arm of a jockey lever 75, engaging the slot and moving in a direction substantially parallel with the axis of the shaft. The jockey lever 75 is carried by a saddle lever 76 and is positioned relatively thereto by springs 75ª the saddle lever engaging cams 46 and 47, the former operating to move the saddle lever upwards and the latter operating to move it downwards.

Figure 5:
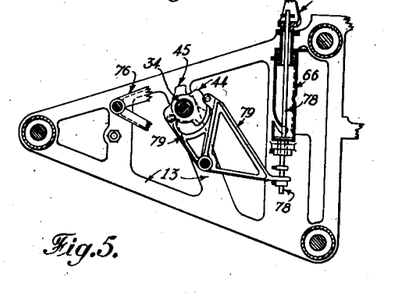

The opening and closing of the carrier arm jaws is effected by a T-shaped lever 77, see Figs. 5 and 16, one part of which is forked to engage a grooved boss 71ª on the sleeve 71, while another part engages a rod 78 extending downwards through the hollow shaft 66 and at its lower end engages a further saddle lever 79 coacting with cams 44 and 45, a further part of the lever 77 being V shape and being designed (on the carrier arm being swung through an arc) to engage the end of a further spring-tensioned lever 80 extending below the playing table 4, and at its other end being forked and extending upwards alongside the playing table, small rubber or like pads or tips 81 being fitted to the vertical parts and forming with the lever 80, "rests" for the selected record whilst same is being released and whilst same is being re-engaged by the carrier arm jaws.

Figure 10:
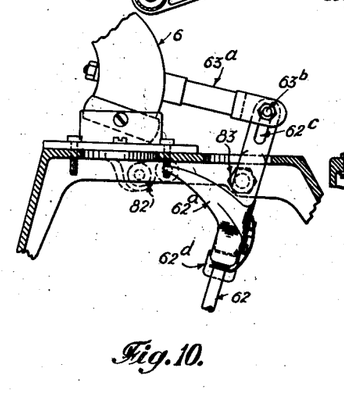
Fig. 10 is a rear view.
Figure 11:
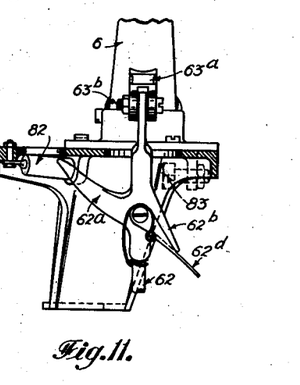
Fig. 11 is a side view of the tone arm and tone actuating mechanism, the tone arm support being shown in section in both views.
Figure 12:
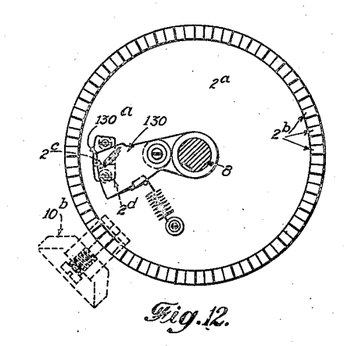
Fig. 12 is an enlarged rear view.

The raising and lowering of the tone arm 6 is effected as aforesaid by means of cam 52, see Figs. 2a and 8 through the medium of a lever 61 and a rod 62, the latter being connected to the lever at one end and to projection 63$^a$ on the tone arm at the other end, the tone arm having a universal mounting, see Figs. 10 and 11. On said connecting rod 62 are inclined spurs 62$^a$, and 62$^b$, which coact with stationary abutments 82, 83, the spur 62$^b$ and abutment 83 coacting as the rod moves upwards, to cause the tone arm to be lowered downwards and inwards on to the record, and the spur 62$^a$ and abutment 82 coacting as the rod is moved downwards to cause the tone arm to move upwards and outwards to a position clear of the wedge of the playing table. The connecting rod 62 preferably engages the tone arm projection 63$^a$ through the medium of a slot 62$^c$ and pin 63$^b$, so that the tone arm is free to rest on the record without any pull from the rod.

For automatically controlling the time a record is in use, and switching over the mechanism for returning the record to the magazine, "timing" gear is provided which comes into operation as the tone arm lowers on the record, and ceases to operate when the tone arm is raised. Such gear comprises a spindle 84 carrying near one end a lever arm 85 adapted to lie immediately below the lever 61 for operating the tone arm and being normally depressed by such lever. Upon said spindle is a further lever arm 86 which at its free end forms the bearing of the shaft of a toothed timing wheel 87, the said wheel lying in a position where it may be moved into and out of mesh with a toothed wheel 88 geared to the motor winding shaft.

The "timing" wheel 87 normally lies clear of the motor driven wheel 88, but when the tone arm is lowered and the lever arm 85 is released, the timing wheel 87 is moved into mesh with the motor wheel 88. On the timing wheel is a peg 89, and on the timing wheel shaft 90 is a crank 91, carrying a regulating screw 92, which the said peg is designed to bear against when the timing wheel has completed its allotted rotation, whereupon the timing wheel shaft 90, owing to the resistance offered by the crank 91, is given a slight rotation and caused to operate a projection 90$^a$ which trips the latching lever 38 controlling the cam-clutch lever 37. This results in (a) the cam shaft 34 being restarted, (b) the tone arm 6 being raised, and (c) the timing wheel 87 being moved clear of the motor driven wheel 88. A spring 93 rotates the timing wheel, and a spring 94, rotates the timing wheel shaft 90 and the crank 91 back to their original positions.

An emergency switch may be provided to stop the playing of a record at any moment, and such switch will preferably comprise a push rod 95 adapted, on being moved a fixed distance, to come into contact with the crank 91 on the timing wheel shaft 90, when the timing wheel 87 is in mesh with the motor driven wheel 88, and thereby give to the crank 91 a slight rotation and trip the latching lever 38 to release lever 37 controlling the cam clutch 33. When the timing wheel 87 is out of mesh (tone arm raised) the extent of the movement of the push rod is not great enough to come in contact with the crank, and nothing happens, i. e. the machine cannot be put out of order.

Figure 22:
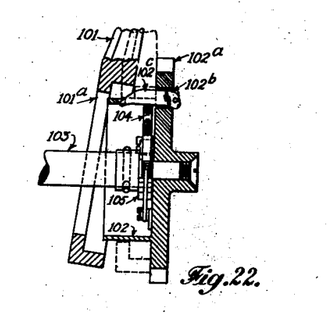
Figure 23:
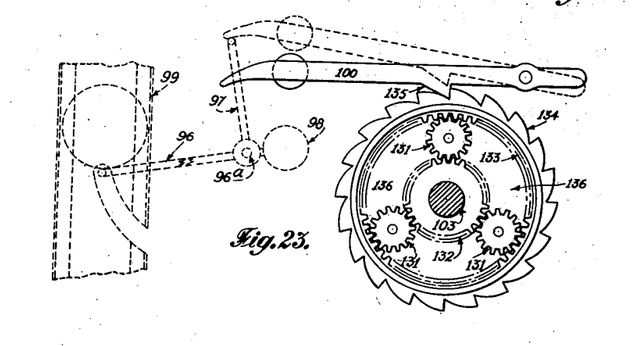
Fig. 23 is a side view of alternative sun-and-planet coin-controlled motor winding mechanism.
Figure 24:
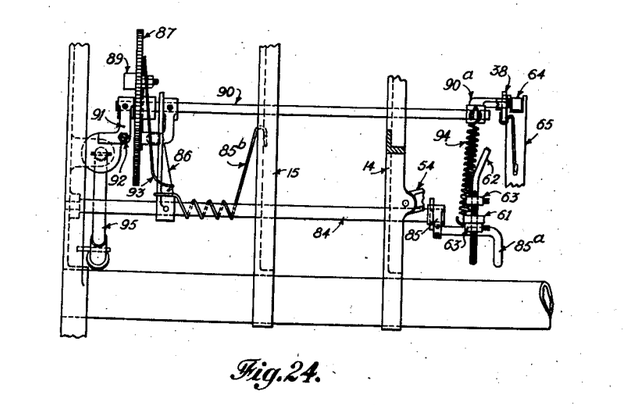
Fig. 24 is a rear view of the parts of the machine which constitute the "timing" gear, and control the raising of the tone-arm when the "end" of the record is reached.

The coin-controlled mechanism comprises a lever with arms 96 and 97, see Figs. 2a and 23, and with a counter-weight 98, the arm 96 projecting into a vertical coin chute 99, which is slotted to allow a cranked end of the arm 96 of the rod to enter the chute, and lie transversely across the chute under the influence of the counter-weight, the arm 97 then lying underneath and holding up the lower and weighted end of a lever 100. A pawl-release lever 101 with forked arm embraces the shorter arm of the lever 100 as shown. At another part, see Figs. 21 and 22, the release lever is formed with an enlarged collar-like portion 101$^a$ which embraces a cylindrical flange 102 projecting from the side of a toothed wheel 102$^a$ loose on the motor-winding shaft 103. Enclosed by such flange 102 is a spring-pressed pawl 104, and also a ratchet wheel 105, this latter being keyed to the motor winding shaft 103.

In said flange 102 on the toothed wheel 103$^a$ is a transverse slot 102$^b$, and journaled in said slot is a small lever 102$^c$ which at its free end, when acted upon by the collar part 101$^a$ of the release lever 101 presses against the spring of the pawl 104, and thereby tends to move the pawl clear of the ratchet wheel 105. The pawl 104 is provided with a tail part which projects through an opening in the flange of the toothed wheel 102$^a$, and as the collar is moved over the flange, cam projections 102$^d$ in the collar lie in the track of the tail of the pawl, and with the collar stationary and the toothed wheel rotated, the pawl is lifted and held clear of the ratchet wheel 105, thereby cutting out the drive between the toothed wheel 102$^a$ and the motor winding shaft 103.

When a penny is placed in the coin chute 99 and overweights the lever arm 96, the shorter arm 97 is moved from below the longer arm of the lever 100 which thereby raises the shorter arm of such lever 100 and through the forked part of the release lever 101 move the collar-like portion 101ª clear of the toothed-wheel flange 102, thus allowing the pawl 104 to engage the ratchet wheel 105.

In such circumstances the rotation of the toothed wheel 102ª produces the desired rotation of the motor-winding shaft 103 to wind up the motor spring. On the completion of the desired amount of winding, mechanism associated with the brake-release devices (hereinafter described) causes the longer arm of the lever 100 to be raised, thus moving back the release lever 101 to a position in which it again engages the toothed wheel flange 102 when, with any further rotation of the toothed wheel, dis-engagement of the pawl and ratchet wheel takes place.

Figure 1A:
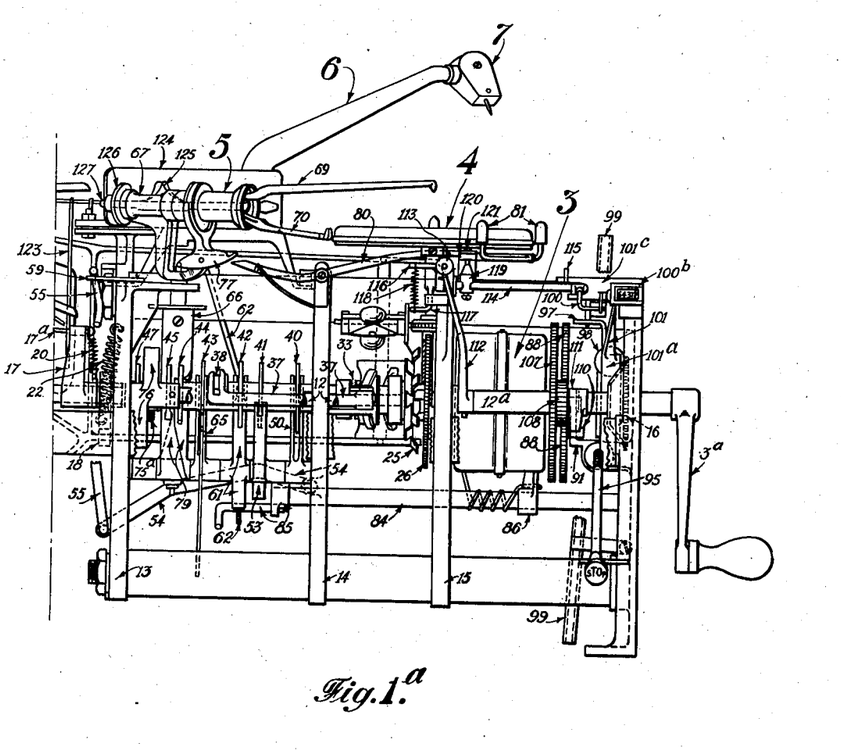

The manner in which over-winding of the motor spring is prevented will now be described: A train of wheels 106, 107, 108, see Figs. 1a and 2a, is employed between the winding shaft 103 and the loose wheel 88 on the same shaft which loose wheel has a small lateral projection 110, adapted to engage the top face of a lever arm 111 keyed to the selector-disc controlling shaft 12. Also keyed to the same shaft is a lever arm 112, which at its free end forms a support or bearing for a link rod 113, which connects to a "toggle" on the motor brake spindle 114. A slight rotation of the shaft 12 by the gear wheel projection 110, and moving the lever arm 111, below it, produces an endwise movement of the link rod 113 and brings about the breaking of the "toggle", which previously held the brake in the "on" position, thereby freeing the motor. At the same time the brake spindle 114 is also given a part rotation. On such spindle, which will preferably be the axis of lever 100, is a pin or shoulder 115, positioned so as to bear against a projection 100ª on the lever 100 when the brake is in the "off" position, and raise the longer arm of the lever 100, thus causing the release lever 101 to engage the flange 102 of the toothed wheel 102ª, and thereby stop the further winding of the motor.

As such time the longer arm of the lever 100 is held raised, and remains raised until all the operations of the machine are completed.

The brake-controlling "toggle" consists of two short lever arms 116, 117 upon the brake spindle 114, one keyed and the other free but having a limited angular movement, a spring 118 connecting the two arms. The aforesaid link rod 113 is connected to the free arm 116. Also keyed to the brake spindle is a further short lever arm 119, which at its free end lies below a spring blade 120 carrying a brake block 121. In one position of the lever arm 119, the block 121 is pressed against the underside of the playing table, and in another position it lies clear of the table, the alternate positions being governed by the "toggle".

The aforesaid companion lever arm 18 on the selector disc control shaft 12, when depressed by pin 110 acting on lever 111 at the end of the motor-spring winding operation, engages a latching hook 122, see Fig. 3, and is thereby held against upward movement and the teeth of the selector disc held in engagement with the fixed stud 10ª until released by the lever 54 when such lever is lowered to re-engage the record between the spokes e and e² of the magazine, such release taking place after the record has been played and returned to its position in the magazine, and after which the machine comes to a standstill. The other companion lever arm 17, at its free end, is provided with a lateral extension 17ª adapted to engage a lever 123 connected with a movable part of the track-changing mechanism of the carrier arm, hereinafter described.

The return rotary movements of the controlling shafts 11, 12 are produced by the latching hook 122, see Fig. 3, being made free by a lever arm 54 connected with the record-releasing devices. On the raising of the lever arm 54 to release the record from the magazine before being picked up by the carrier arms, an extremity of the lever arm 54 passes a non-return bar 122ª pivoted on the axis of the latching hook 122. On the lowering of the lever arm 54 to cause the spokes e, e² to regrip the record after being replaced in the magazine, the said extremity of the lever arm meets the non-return bar 122ª and trips the latching hook 122, thereby releasing the lever arm 18 of the control shaft 12 previously held down by the hook 122, see Fig. 3, and allowing it to rise in response to the pull of its spring 22 until it meets the "stop" 19ª. Simultaneously, the companion lever arm 17 of the control shaft 11 is raised, thereby causing the selector disc 2ª to be moved clear of the locking stud 10ª on the stationary bracket 10ᵇ, and also clear of the pin 9ᵇ on the arm 9ª of the magazine shaft 9. At the same time, the lever arm 122 carrying the "toggle" link 113 is moved back to its original or normal position, thereby rebraking the motor and also moving the pin 115 on the brake spindle 114 away from the shoulder 100ª of the hub of lever 100, see Fig. 2, and leaving the longer arm of the lever 100 free to fall when the lever arm 97 is moved from below it. The insertion of the next coin tilts the lever arms 96, 97, and allows the lever 100 to fall, and thereby operate the release lever 101 to free the pawl and ratchet gear, preparatory to re-winding, the machine thus always being left ready for re-use after a record has been played.

The mechanism, see Figs. 3, 17 and 18 for giving a half turn to the carrier arm 5 when it is required to reverse the record prior to placing it upon the playing table 4, and for afterwards giving the arm a reverse half-turn prior to replacing the record in the magazine, comprises a plate 124 having an opening or slot 124$^a$ part of which is triangular in shape, and a further plate 125 within said opening or slot of triangular shape, which in one position, see Fig. 17 produces a straight horizontal track $x$ and in another position, see Fig. 18, produces an inverted V-shaped track $y$. The plate 124 may be raised and lowered bodily or the plate 125 may be raised and lowered, preferably the latter as in the example shown.

Keyed to the end of the spindle 68 of the carrier arm 5 is a small crank 126, the pin 127 of which engages one of the tracks $x$ or $y$ formed by the plates 124, 125. When the carrier arm jaws 69, 70 do not require to reverse the record, the crank pin 127 travels in the horizontal track $x$, while when the record requires to be reversed, the part 125 of the plate is lowered to a position where the crank pin 127 will enter the V-shaped track $y$ and as the carrier arm 5 swings round to pick up the record from the magazine, the track $y$ will cause the crank 126 to impart the desired half-turn to the carrier arm 5, a reverse movement of the crank 126 as the carrier arm 5 moves back taking place and thus causing the record to be placed on the table 4 with the side previously lowermost in the magazine uppermost when on the table, the jaws of the carrier always resuming their normal position when over the table. Similarly, on the return movement of the carrier arms to replace the record in the magazine, the record is reversed so that it shall lie in the magazine in its original position.

Part 125 of the track plate is supported and moved vertically by a lever arm 128 carried by a horizontal shaft 129 and on the same shaft is a long spring arm 123, which extends downwards into the path of the lever arm 17 keyed to the selector-disc controlling shaft 11.

With the downward movement of this controlling shaft lever arm 17, the lateral extension 17$a$ at its free end, holds or releases the spring arm 123, depending upon the length of the downward movement of the lever arm 17 (controlled by the depth of the teeth spaces of the selector disc). If the selector disc is opposite a shallow tooth space, the extent of the downward movement of lever arm 17 will be just sufficient that the lateral extension 17$a$ is still in contact with the spring arm 123, thus holding the track plate at the higher position, Fig. 17, making the track $x$. If the selector disc is opposite a deeper tooth space, the extent of the downward movement of the lever arm 17 will be sufficient to move the lateral extension 17$a$ out of contact with the spring arm 123, thus allowing the track plate to fall by gravity to the lower position, Fig. 18, making track $y$.

To cause the needle 7$a$ of the sound box 7 to move into engagement with the groove of the record when such groove lies nearer the centre of the record than the tone arm is set for, a light, spring-impelled cam plate 62$d$, see Fig. 11, is fitted to the tone arm connecting rod 62, and in such manner as practically to form an extension of the spur 62$b$ on such rod, which cam plate operates to lightly press against the setting screw 83 after the tone arm has come to rest on the record, due to the slot 62$c$ in the rod 62, which allows of upward movement of the rod after the needle is resting on the record, the effect of the slight lateral pressure being to give the needle a tendency to travel towards the groove of the record.

In place of the spur projections 62$a$, 62$b$ on the tone-arm connecting rod 62, and the abutments 82 and 83 on the stationary parts, a fixed cam plate may be arranged on the stationary parts, and a roller mounted on the connecting rod, relative adjustments being made by moving the plate, and the auxiliary spring plate being applied to the cam plate.

The devices for releasing the records from the magazine comprise as before described the cam 41 on the cam shaft 34 and the lever 53, one end of which lever engages the cam while its other end lies below the lever arm 54. This lever arm is connected at its free end to rod 55 extending upwards to, and passing through fixed guide 59 and at a point above such guide, the end of the rod is bent at right angles to the rod, such end part lying out of the path of the magazine spring gripping spokes $e^2$ when the magazine is in motion, but lying immediately below and in the path of one of said spokes i. e. the gripping spoke of the selected record, when the magazine is stationary, so that, immediately the record has to be taken from the magazine, the rod 55 lifts the spring spoke $e^2$ clear of the record and frees the record in readiness to be picked up by the carrier arm jaws. The rod 55 holds the spring spoke $e^2$ of the magazine raised until the record is replaced, the lowering of the rod 55 tripping the latching hook 122 as before described.

To provide against the possibility of the shoulders 2$c$, 2$d$, on the rear of the selector disc 2$a$ after being set and when moved endwise towards the magazine 1 abutting against the end of the selector pin 9$b$, instead of against the side of the pin, the end faces of the shoulders 2$c$, 2$d$ are normally covered by a spring-controlled swivel plate 130, which presses back the selector pin 9$b$ when contacting therewith, but which is moved (swivelled) by the pin 9b to uncover the shoulders 2c, 2d, after the magazine has made a further rotation.

To guard against the possibility of the end of a selector disc tooth binding against the fixed disc-locking stud 10a the ends of the teeth are bevelled off, or pointed, also the said swivel plate 130 covering the shoulders 2c, 2d, is formed with a slightly curled-up corner or V-shaped extension 130a against which the selector arm pin 9b will brush or rub as it moves round with the magazine, and thereby impart a slight rotary movement to the selector disc 2a sufficient to cause the point of the tooth which may be binding on the locking stud to slip off and allow one of the tooth spaces to engage with the locking stud.

As an alternative, the locking stud may have a slight lateral movement to right and left of its normal central position, the stud being pointed.

The following is a brief description of the successive operations of the machine:
First, the selector dial 2 is moved to bring the title or number of the desired record opposite a fixed arrow point. A coin is then placed in the coin chute 99. The motor 3 is then wound up by the winding handle 3a, the coin and release lever having freed the pawl 104 to engage the ratchet wheel 105. As the winding nears its predetermined limit, the brake "toggle" is broken, and the lever 100 tilted upwards to bring about the disengagement of the winding gear. The motor being now free of all restraint, starts to operate the machine, the first action being to move the cams 40 to 47 to such positions that the slipping-clutch cam lever 50 is opposite a gap in the cam 40, see Fig. 7, and the cam clutch 33 is disengaged. The spring 35 for holding the parts of the slipping clutch in engagement is also made free to exert itself, thus maintaining the driving connection between the motor wheel 26 and the magazine driving pulley 25. The magazine is then rotated until the selector arm pin 9b meets the shoulder 2c, 2d on the rear of the selector disc 2a, when the magazine is stopped, the clutch between the pulley 25 and motor wheel 26 slipping. As the clutch slips and causes lateral movement of the pulley 25 it trips the latching lever 38 holding the cam clutch 33 out of engagement with the cam shaft 34, and allows such clutch to engage under the influence of the spring 39, and thereupon rotate the cam shaft and cams. The tripping of the lever 38 is brought about by the lateral movement of the pulley 25 which causes the bell-crank lever 36 to depress the rear end of the latching lever 38 through the medium of a small pawl 36b at the end of its longer arm 36a.

The rotations of the cams successively cause, (a) the slipping clutch cam lever 50 to be moved to a position such that the slipping clutch is prevented reengaging; (b) the record-releasing rod 55 to be raised to release the record in the magazine; (c) the carrier arm 5 to be moved from its normal position over the playing table to the magazine; (d) the carrier arm jaws to engage and lift the record; (e) the carrier arm jaws to be moved back until the upper jaw and the record occupy a position over the playing table; (f) the record to be released from the carrier arm jaws, and allow it to rest on the playing table; (g) the tone arm to be lowered on the record, and (h) the cam clutch to be disengaged. As the tone arm lowers, the "timing" gear comes into operation. The tone arm and the motor are then free to play the record.

After the record has made the required number of rotations, the "timing" gear functions to release the cam clutch 33 and allow it to re-engage and set the cams again in motion, whereupon the following successive operations ensue: (i) the tone arm is raised from the record; (j) the record is lifted from the playing table and engaged by the carried arm jaw; (k) the carrier arm and record are moved back to the magazine; (l) the record is released from the carrier arm jaws; (m) the carrier arm jaws are returned to their normal position, and (n) the rod 55, for releasing the magazine gripping spoke, is lowered. The lowering of this rod also trips the latching hook 122 holding the lever arm 18 of the main control shaft 12, and allows such shaft to rotate back to its original position under the pull of the lever arm spring 22, thus unlocking the selector disc 2a and also recompleting the "toggle" to apply the brake, when the whole machine is stopped, the index dial and selector disc being then free to be revolved for a fresh selection.

Figure 21:
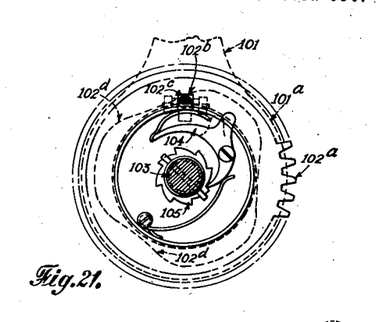
Fig. 21 is a side view and Fig. 22 a longitudinal section of coin-controlled pawl-and-ratchet motor winding mechanism.

In place of the ratchet wheel and pawl for winding the motor, Figs. 21 and 22, an arrangement of sun-and-planet gearing may be provided, see Fig. 23, the planet pinions 131 meshing with the sun pinion 132 and with the inner ring of spur tooth 133 of a ratchet wheel 134, while with the teeth of the ratchet wheel engages a pawl tooth 135 on the lever 100. The planet pinion axes will be carried by a plate 136 associated with the handle of the winding gear, while the sun pinion 132 will be keyed to the motor winding spindle 103. With the pawl tooth of the lever 100 in engagement with the ratchet wheel, and the winding handle rotated, the resistance offered by the ratchet wheel will cause the sun wheel to rotate and wind up the motor. On freeing the ratchet wheel, any further movement of the winding handle will only result in the ratchet wheel rotating idly.

The machine may be electrically operated, an electric motor being substituted for the spring motor in which case (if coin-controlled), the insertion of a coin will bring about the completion of the circuit of the motor and the return of the pick-up and carrier devices to the normal position will bring about the breaking of the circuit. Further, an additional cam will be provided to lock the selector disc 2a and dial 2 after the latter have been rotated to the record selected position. In this arrangement, the winding gear will be omitted.

Actuated by the shorter arm of the lever 100 may be a counter 100b for recording the number of times the machine is used, or the number of records played.

The whole of the mechanism will usually be enclosed in a glass-fronted casing, and within the casing may be a sound horn for conveying the sound of the record to the exterior of the casing.

What we claim is:—

1. An automatic multiple record sound reproducing machine comprising a turntable, a rotary record magazine mounted to rotate in a vertical plane, an adjustable stop to arrest the magazine so as to bring a selected record into the plane of the turntable, a record carrier for transferring the selected record from the magazine to the turntable for playing and back to the magazine after playing, a tone arm movable towards and away from the turntable, a motor for rotating the turntable and magazine, for moving the carrier arm and for raising and lowering the tone arm, and a two-way clutch normally connecting the motor to the magazine but operated by the arresting of the magazine to disconnect the motor therefrom and connect it to the record carrier and tone arm, as set forth.

2. In an automatic multiple record sound reproducing machine as claimed in claim 1, a two-way guide track for the record carrier and a switch operated by the adjustable stop to close one or other of the trackways, one of the track ways causing a half turn of the record carrier to reverse the record, as set forth.

3. In an automatic multiple record sound reproducing machine as claimed in claim 1, the record magazine comprising a hub part, fixed flat-faced spokes in the hub part with their outer ends forked, and further spokes flexibly connected to the fixed spokes, each having a pointed peg or stud to enter the central hole in the record and each being slightly longer than the fixed spokes, as set forth.

4. In an automatic multiple record sound reproducing machine as claimed in claim 1, the record magazine keyed to a shaft journaled in the machine frame, a selector arm, with spring pin, on the said shaft, a further shaft co-axial with the magazine, a selector disc slidably keyed to such further shaft and having teeth on the face next the magazine with the alternate teeth spaces of different depth from the intermediate teeth spaces and said disc also having two shoulders of different depths on the face next the magazine, a fixed bracket and stud adjacent the selector disc, and an index dial operatively coupled with the selector disc shaft, such dial on being rotated to bring the selected record title opposite a fixed point rotating the selector disc so that one of the teeth spaces is brought opposite the stud of the fixed bracket, and one of the shoulders on the selector disc into the path of the spring pin of the selector arm of the magazine shaft, as set forth.

5. In an automatic multiple record sound reproducing machine as claimed in claim 1, a selector disc slidably mounted on a shaft co-axial with the magazine shaft, a pair of control shafts arranged end to end and their adjacent ends having companion lever arms, a spring causing the lever arms normally to approach each other, a fixed stud normally engaged by the lever arms, one of the control shafts having a lever arm engaging the selector disc, and the other control shaft at the end furthest from the companion lever arms having its bearings in the hub of a gear wheel of the motor, and said shaft having near such gear wheel a further lever arm, and a pin or stud on another wheel of the motor moving in the path of such further lever arm and depressing against the resistance of a spring, as set forth.

6. In an automatic multiple record sound reproducing machine as claimed in claim 1, a control shaft, a lever arm on the control shaft, a brake for preventing rotation of the turntable, a link and "toggle" between the lever arm and brake for controlling the brake and holding or releasing the turntable, a gear wheel in the motor, and a pin on such wheel moving in the path of the lever arm, to depress it and break the toggle and thereby release the turntable, and a spring to return the lever arm and control shaft to their original positions to make the "toggle" and apply the brake, as set forth.

7. In an automatic multiple record sound reproducing machine as claimed in claim 1, a gear wheel driven by the motor, a pulley adjacent to the gear wheel, a slipping "clutch" between the wheel and pulley, a further pulley on the magazine and an endless cord passing over the pulleys, the clutch slipping when the magazine is arrested by the adjustable stop, but serving to rotate the magazine when not so held, as set forth.

8. In an automatic multiple record sound reproducing machine as claimed in claim 1, the record carrier comprising a pair of grippers hinged to each other, a spring tending normally to separate them, a rotary block carrying the grippers, a cam housing encircling the rotary block and engaging the grippers, a pivoted yoke lever for sliding the cam housing along the block to close the grippers, a vertical spindle carrying the housing and block, a cam on the vertical spindle, a control shaft, cams on the control shaft, and levers co-acting respectively with said cams to rotate the vertical spindle for carrying the record from magazine to turntable and vice versa, and to slide the cam housing for gripping and releasing the record, as set forth.

9. In an automatic multiple record sound reproducing machine as claimed in claim 1, a record carrier comprising a pair of grippers hinged to each other, a spring tending normally to separate them, a rotary block carrying the grippers, a cam housing encircling the rotary block and engaging the grippers, a pivoted yoke lever for sliding the cam housing along the block to close the grippers, a vertical spindle carrying the housing and block, a cam on the vertical spindle, a control shaft, cams on the control shaft, and levers co-acting respectively with said cams to rotate the vertical spindle for carrying the record from magazine to turntable and vice versa and to slide the cam housing for gripping and releasing the record, a track plate adjacent the record carrier with cam slot, a roller on the rotary block moving in the slot, a movable segment in the plate for varying the direction of the roller in the slot, and a sliding disc on the magazine shaft with short and long slots to vary its sliding movement, a fixed stop to arrest the sliding disc and links and levers connecting the sliding disc to the movable segment so that movement of a long slot over the fixed stop causes the segment to divert the roller in the track, as set forth.

In testimony whereof we have signed our names to this specification.

JOHN GEORGE BRENNER.
BERNARD WILLIAM BRENNER.